United States Patent
Fontana, Jr. et al.

(10) Patent No.: US 6,168,845 B1
(45) Date of Patent: Jan. 2, 2001

(54) PATTERNED MAGNETIC MEDIA AND METHOD OF MAKING THE SAME USING SELECTIVE OXIDATION

(75) Inventors: Robert Edward Fontana, Jr.; Richard Hsiao, both of San Jose; Ernesto Esteban Marinero, Saratoga; Hugo Alberto Emilio Santini, San Jose; Bruce David Terris, Sunnyvale, all of CA (US)

(73) Assignee: International Business Machines Corporation, Armonk, NY (US)

(*) Notice: Under 35 U.S.C. 154(b), the term of this patent shall be extended for 0 days.

(21) Appl. No.: 09/233,710

(22) Filed: Jan. 19, 1999

(51) Int. Cl.$^7$ .......................................... B32B 3/02
(52) U.S. Cl. .................... 428/65.5; 204/192.2; 427/128; 427/130; 427/131; 427/132; 427/250; 427/255.19; 427/255.4; 427/259; 427/267; 427/269; 427/282; 427/331; 427/398.4; 427/399; 427/404; 427/405; 427/407.1; 427/409; 427/419.2; 427/539; 427/552; 427/576; 427/595; 428/65.3; 428/65.6; 428/65.7; 428/450; 428/457; 428/694 T; 428/694 TP; 428/697; 428/701; 428/702; 428/704; 428/900
(58) Field of Search ....................... 204/192.2; 427/128, 427/130, 131, 132, 250, 255.19, 255.4, 259, 267, 269, 282, 331, 398.4, 399, 404, 405, 407.1, 409, 419.2, 539, 552, 576, 595; 428/65.5, 694 TP, 65.3, 697, 65.6, 701, 65.7, 702, 450, 704, 457, 900, 694 T (56) References Cited

U.S. PATENT DOCUMENTS

| | | | |
|---|---|---|---|
| 4,935,278 | 6/1990 | Krounbi et al. ................... | 428/64 |
| 4,948,703 | 8/1990 | Falcone et al. .................... | 430/281 |
| 5,571,591 | 11/1996 | Brady et al. ...................... | 428/65.3 |
| 5,772,905 | 6/1998 | Chou .................................. | 216/44 |

OTHER PUBLICATIONS

Chou, S., Patterned magnetic nanostructures and quantized magnetic disks, Proc. IEEE, 85(4), pp. 652–671, Apr. 1997.

Bajorek, C. et al., Magnetically discrete but physically continuous recording tracks, IBM Tech Disclosure, 18(5), pp. 1641–1642, Oct. 1975.

Fernandez, A. et al., Magnetic force microscopy of single–domain cobalt dots patterned using interference lithography, IEEE Trans. Mag., 32(5), pp. 4472–4474, Sep. 1996.

Krauss, P. et al., Fabrication of planar quantum magnetic disk structure using electron beam lithography, reactive ion etching, and chemical mechanical polishing, J. Vac. Sci. Tech., 13(6), pp. 2850–2852, Nov./Dec. 1995.

Chou, S. et al., Imprint lithography with 25–nanometer resolution, Science, vol. 272, pp. 85–87, Apr. 5, 1996.

Primary Examiner—Bernard Pianalto
(74) Attorney, Agent, or Firm—Lumen Intellectual Property Services (57) ABSTRACT

A new method for making patterned magnetic storage media with magnetic and substantially non-magnetic zones utilizes a selective oxidation processes. Selective oxidation is achieved by subjecting a magnetic layer to an oxygen plasma through voids in a patterned mask. A high resolution patterned mask is made by embossing and reactive ion etch processes. The method is used to fabricate patterned magnetic disks media with alternating magnetic and non-magnetic zones ranging from 10 to 1000 Nanometers in width. Magnetic storage disks produced by this method have high-bit densities, minimal topography and reduced signal noise.

40 Claims, 7 Drawing Sheets

PATTERNED MAGNETIC MEDIA AND METHOD OF MAKING THE SAME USING SELECTIVE OXIDATION

FIELD OF THE INVENTION

This invention relates generally to patterning magnetic materials for use in magnetic storage media. In particular this invention relates to patterning magnetic materials by selective oxidation of a magnetic disk using an oxygen plasma.

BACKGROUND

Conventional magnetic recording disks are made with a continuous magnetic layer that is deposited on an aluminum alloy substrate coated with a nickel-phosphorus layer (referred to hereon as continuous magnetic disk media). The magnetic materials in magnetic disk fabrication are generally nickel, cobalt and iron alloys that are deposited on the nickel-phosphorus layer by evaporation or sputtering to form the continuous magnetic layer. A primary goal for developing improved magnetic storage media is to increase the bit densities.

In conventional magnetic recording media, each magnetic bit is composed of several hundred small grains. One approach to increasing the bit density of the magnetic media is to reduce the grain sizes along with the bit sizes while keeping the total number of grains per bit approximately constant. This approach is limited because grains that are too small (1 to 7 Nanometers) are thermally unstable and thus will spontaneously switch magnetization direction at normal operating temperatures. Additionally, if the number of grains is reduced, the noise arising from statistical fluctuations in grain positions or orientation will increase. Patterning magnetic disk media is a method to overcome the problems associated with increasing bit densities by reducing grains size.

Increasing bit densities of magnetic recording media can be achieved by patterning the magnetic material into small isolated islands such that there is a single magnetic domain in each island or bit. The single magnetic domains can be a single grain or consist of a few strongly coupled grains that switch magnetic states in concert as a single magnetic volume. With only a single magnetic volume per island, noise fluctuations arising from grain positions or orientation are eliminated.

Methods of patterning magnetic disk media into small isolated magnetic domains has been demonstrated. For example, Fernandez et al. characterizes isolated Co magnetic domains in "Magnetic Force Microscopy of Single-Domain Cobalt Dots Patterned Using Interference Lithography", IEEE Trans. Mag., Vol. 32, pp. 4472–4474, 1996, wherein Interference lithography is used to pattern a resist coated silicon wafer followed by thermal evaporation of Co to generate isolated arrays of magnetic domains. Krauss et al. in "Fabrication of Planar Quantum Magnetic Disk Structure Using Electron Beam Lithography, Reactive Ion Etching, and Chemical Mechanical polishing" J. Vac. Sci. Technol. B 13 (6), pp. 2850–2852, November/December 1995, describes an etching processes to define the magnetic domains followed by an electro-plating step to make isolated Ni magnetic domains. These methods of making isolated magnetic domains require that the magnetic material is deposited after the patterning step or steps and require polishing steps to make the surfaces of the magnetic media smooth.

Falcone et al., in U.S. Pat. No. 4,948,703 describes a method of embossing a photo-polymer to pattern the surface of an optical disk and Chou et al., in "Imprint Lithography with 25-Nanometer Resolution", Science, Vol. 275, Apr. 5, 1996, and U.S. Pat. No. 5,772,905 describes a method for embossing PMMA at elevated temperatures and pressures with a template to achieve high resolution patterning. Chou in "Patterned Magnetic Nanostructures and Quantized Magnetic Disks", Proc. IEEE, Vol. 85, No 4, pp. 652–671, April 1997, further describes a method for making magnetic domains with ferromagnetic materials such as cobalt or nickel by electroplating a PMMA embossed surface. The magnetic material fills the depressions in the embossed PMMA surface and creates small magnetic domains. The surface is polished to remove the magnetic material on the mask and leave the magnetic material in the patterned areas. Electro-plating magnetic material on a patterned surface limits compositions of magnetic materials that can be used for making a magnetic storage media, and therefore, common composite magnetic materials such as CoCrPt could not readily be used to make magnetic media by this method.

Patterning magnetic media has also been used for making magnetic disk media with alternating magnetic and non-magnetic radial tracks. Patterning a disk with magnetic and non-magnetic radial tracks allows the track widths to be reduced. Patterning magnetic disk media with alternating magnetic and non-magnetic radial tracks also reduces signal noise that results from track edge anomalies and cross-talk between magnetic information stored in adjacent bits.

A method for making magnetic media with alternating magnetic and non-magnetic tracks is described in the IBM Technical Disclosure Bulletin, Vol. 18 No. Oct. 15, 1975. The magnetic tracks are patterned by coating a photo-resist on an alpha-iron oxide layer and exposing the photo-resist through a patterned mask. The exposed photo-resist is then removed and cobalt or iron is deposited over the patterned alpha-iron oxide layer. The disk structure is then annealed and the cobalt or iron converts patterned alpha-iron oxide into ferro-magnetic material. The remaining photo-resist is removed resulting in a disk structure with magnetic tracks separated by non-magnetic tracks. Brady et al., in U.S. Pat. No. 5,571,591, describes a method for patterning magnetic material using standard lithographic techniques to leave protected and unprotected areas of the magnetic layer. Germanium or silicon is then deposited over the patterned magnetic layer and in a subsequent annealing the germanium or silicon diffuses into the patterned magnetic layer producing patterned areas that are non-magnetic. Both of these methods for patterning magnetic media require an annealing step and result in significant topographic variation between the magnetic and non-magnetic regions on the surface of the magnetic layer. U.S. Pat. No. 4,935,278, issued to Krounbi et al., describes making a magnetic disk structure with alternating magnetic and non-magnetic radial tracks by coating a photo-resist over a magnetic layer and patterning the photo-resist using standard lithographic techniques. The patterned areas of the magnetic material are then etched away and the created voids are refilled with non-magnetic material to generate a disk structure with separated magnetic and non-magnetic tracks.

What is needed is a method for producing magnetic disk media with magnetic and substantially non-magnetic zones where the magnetic zones are isolated and the magnetic domain sizes are made to optimize media storage densities. Substantially non-magnetic zones, herein is referred to as non-magnetic zones that have a local magnetic moment that is reduced by at least 25% by the method relative to the magnetic zones. The method needs to be applicable to pre-deposited composite films, such as smooth sputtered CoCrPt films on disk substrates. Furthermore, the method for producing such a magnetic storage disk needs to result in minimal surface topographic variations without requiring expensive polishing steps.

OBJECTS AND ADVANTAGES

Accordingly, it is a primary object of the present invention to provide a new method of making magnetic material with patterned magnetic and substantially non-magnetic zones. The non-magnetic zones are created by selective oxidation of patterned magnetic layers. The patterned magnetic layers are exposed to an oxygen plasma through voids in a mask. The magnetic zones are protected by a mask during the oxidation process. Using oxygen plasma to selectively create non-magnetic zones has the advantages of being faster and less expensive than the annealing processes reported in prior art. Additionally, the method can be applied to patterning magnetic media, whereby the magnetic material is deposited before the patterning process allowing for a greater variety of magnetic media to be patterned by this method.

A second objective of this invention is to provide a method to make magnetic disk storage media that have minimal surface topographies without a polishing step. A smooth magnetic layer surface with minimal topographic variations means that the subsequently deposited protective overcoat, typically amorphous carbon, will replicate the smooth surface. The smooth outer surface of the disk allows for a very low flying height of the slider during read and write operations.

An additional objective of the following invention is to provide a method to fabricate magnetic disk storage media with alternating magnetic and non-magnetic radial tracks. Magnetic storage disk media made by this method can have bit density greater than 100 Gb/in$^2$ and reduced signal noise that results from track edge anomalies.

SUMMARY

The objects and advantages are obtained by providing a suitable substrate with a magnetic layer useful for magnetic recording. The substrate can be nickel-phosphorus plated aluminum-magnesium (Al—Mg) used in conventional disk fabrication. The magnetic material is deposited on the substrate by any suitable method that generates a continuous magnetic layer ranging from 1.0 to 500 Nanometers in thickness. Suitable methods for depositing the magnetic layer include sputtering, ion beam deposition and thermal evaporation. The magnetic layer is then covered by a mask that determines the patterning of the non-magnetic zones.

For example, a photo-resist is coated on a magnetic layer and is exposed to ultra-violet radiation through a conventional lithographic mask. The unexposed portions of the photo-resist mask are then removed to generate a resist mask with voids. The voids in the resist correspond to uncovered areas of the magnetic layer. The mask and the uncovered magnetic layer are then exposed to oxygen plasma and the oxygen plasma will destroy or reduce the local magnetic moments of the uncovered areas of the magnetic layer. The areas of the magnetic layer covered by the resist mask will remain magnetically unchanged. After the oxidation step is complete, the photo-resist mask is removed resulting in a patterned magnetic medium with discrete magnetic and non-magnetic zones. The discrete magnetic and non-magnetic zones have a continuous smooth surface onto which the protective coating is deposited.

Alternatively, a mask is made by depositing a metal layer over a magnetic layer made by the method described previously. The preferred non-magnetic metal layer is tantalum with a thickness ranging between 2 to 1000 Nanometers. The metal layer is deposited by any suitable method that provides a continuous metal coating over the magnetic layer. Suitable methods of depositing the metal layer include sputtering, ion beam deposition and thermal deposition. After the metal layer is deposited on the magnetic layer, a polymer material is coated on the metal layer and the coated polymer is patterned by an embossing process. A preferred polymer material is PMMA or an Acrylate-based photo-polymer. A PMMA coating is heated to its glass transition temperature and is patterned by impressing the surface with a template with a predetermined pattern. A photo-polymer on the other hand is patterned by impressing a template having a predetermined pattern on the surface of the photo-polymer coating and then cross-linking the exposed photo-polymer with ultra-violet light.

In the embossing process, a template with raised and depressed surfaces of a desired pattern is pressed on the surface of the masking polymer resulting in a patterned polymer. The raised surfaces of the template are depressed surfaces on the patterned polymer and depressed surfaces of the template are raised surfaces of the patterned polymer. The template that is used for patterning the masking polymer is a silicon wafer that has been patterned by standard lithographic techniques or preferably by electron beam writing for high resolution patterning.

The patterned polymer layer is then exposed to an oxygen plasma that etches the polymer. The exposure time is controlled so that the depressed features of the masking polymer are etched to form uncovered areas of the metal under-layer while maintaining a polymer mask corresponding to the raised surfaces. Uncovered areas of the metal under-layer and the remaining polymer mask are then subjected to a reactive ion etching process in a plasma containing fluorine. The reactive ion etching process in the plasma containing fluorine removes the uncovered areas of the metal under-layer exposing areas of the underlying magnetic layer and making a metal mask. In the next step, the exposed areas of the magnetic layer and the polymer mask are subjected to an oxygen plasma, thus removing the polymer mask and converting the exposed magnetic areas into non-magnetic areas. In a third etching step a reactive ion etch in a fluorine containing plasma is used to remove the metal mask resulting in patterned magnetic media with a smooth surface and with isolated magnetic and non-magnetic zones. The method described can be used to fabricate magnetic storage disks with alternating magnetic and non-magnetic zones as small as 10 Nanometers and with bit densities in excess of 100 Gb/in$^2$.

DESCRIPTION OF THE FIGURES

FIGS. 3 a, b, c, d, e, f, and g are cross sections of a patterned magnetic media made according to preferred embodiment of the invention.

DETAILED DESCRIPTION

Figure 1:
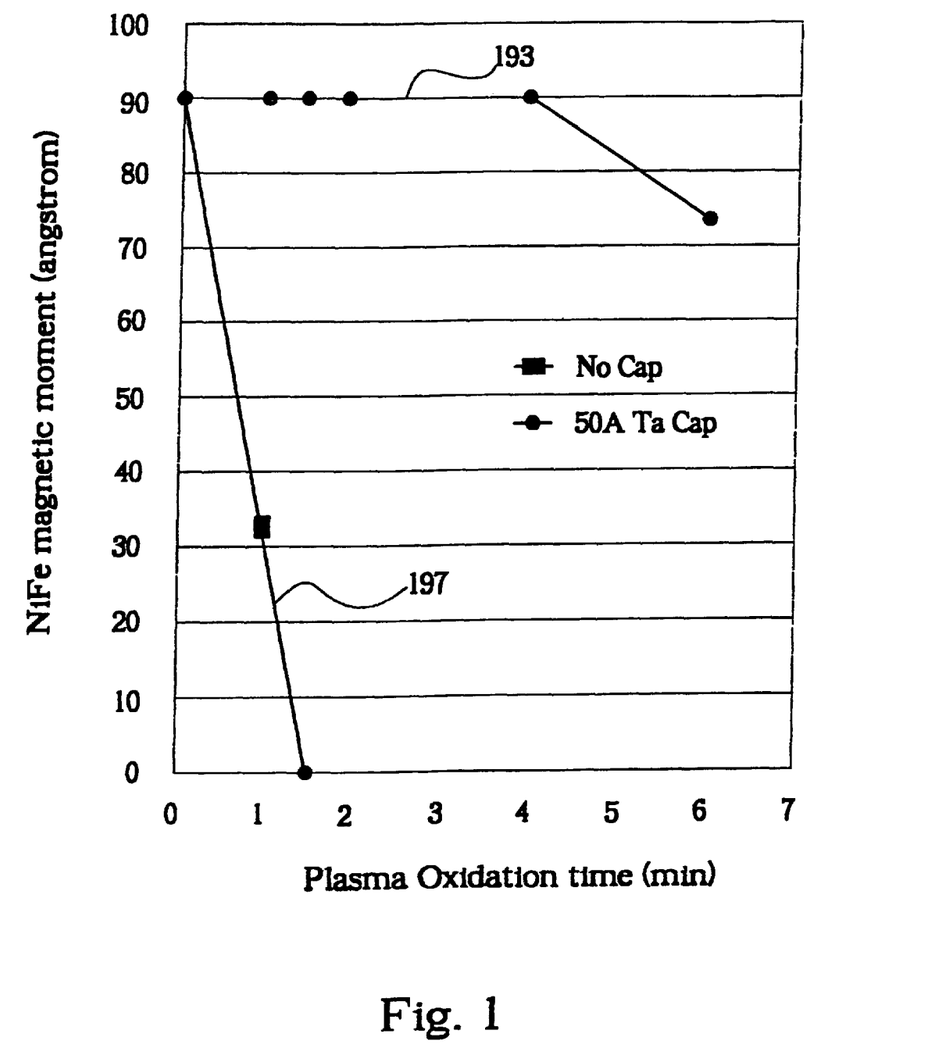
FIG. 1 is a graph plotting the magnetic moments versus time for a nickel-iron magnetic layer structures with a Ta coating 50 Angstrom thick and without a Ta coating exposed to an oxygen plasma.

FIG. 1 is a graph that plots the magnetic moment values of a nickel-iron alloy layer exposed to an oxygen plasma over a two minute period as shown by line 197. In this example, after two minutes of exposure to the oxygen plasma the magnetic moment of the nickel-iron alloy layer has been destroyed. The line 193 plots magnetic moment values of a magnetic layer with the same composition exposed to an oxygen plasma for six minutes. In this case the magnetic layer comprising a nickel-iron alloy is covered by a protective tantalum coating that is 50 Angstroms thick and deposited prior to exposure to a oxygen plasma. The magnetic moment value of the magnetic layer with the protective tantalum coating remains constant until four minutes of exposure to oxygen plasma and then slowly decreases. The rapid reduction in the magnetic moment values of the magnetic layer without a protective tantalum coating when exposed to oxygen plasma is used to pattern the non-magnetic zones of magnetic materials in the method of this invention.

Figure 2:
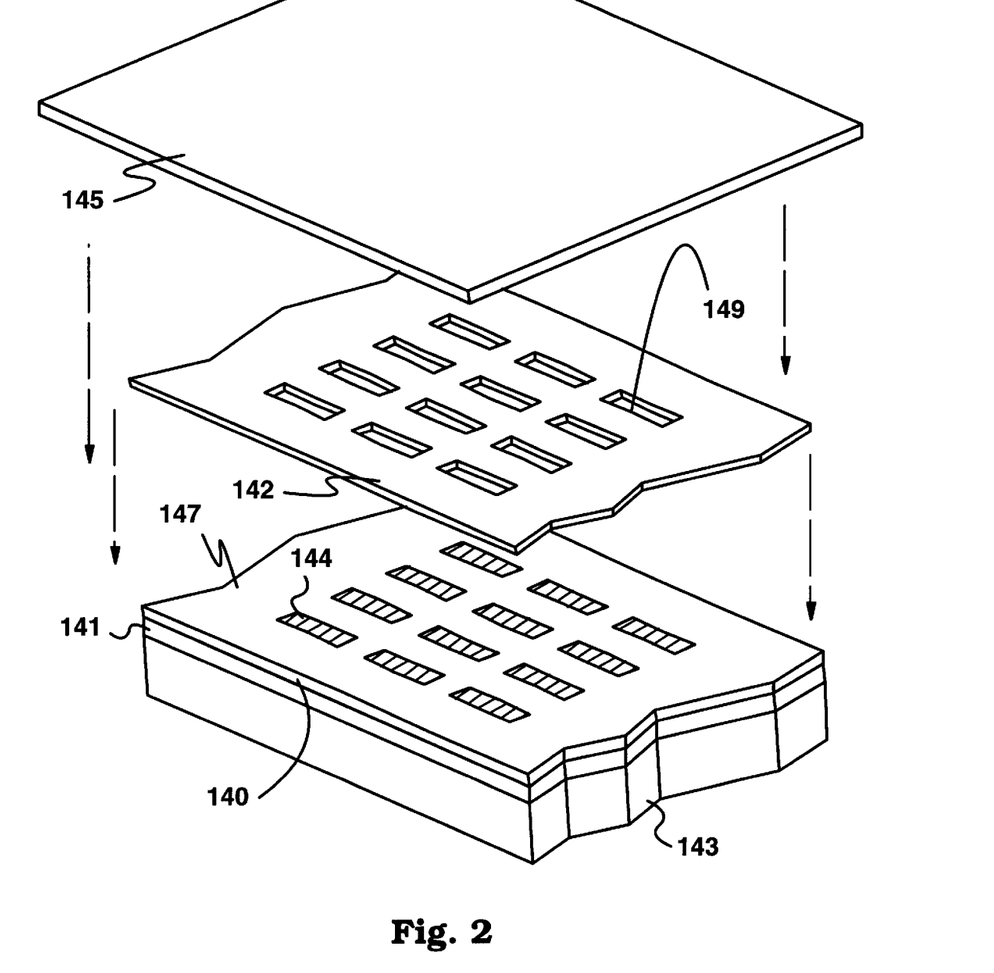
FIG. 2 is magnetic surface that is patterned using a mask and an oxygen plasma; the hatched areas are non-magnetic zones and the un-hatched areas are the magnetic zones.

FIG. 2 illustrates a general method of patterning a magnetic surface of a disk media into magnetic and non-magnetic zones using selective oxidation of a magnetic surface. A nickel-phosphorus 141 coated aluminum-magnesium (Al—Mg) substrate 143 is provided to support a magnetic coating 140. It will be clear to persons familiar with the art that the substrate 143 can be any suitable substrate that a magnetic layer can be deposited on, such as glass, silicon, quartz sapphire or aluminum-magnesium. The magnetic material 140 is preferably an alloy of nickel, iron, or cobalt and is deposited on the nickel-phosphorus coating 141 by any suitable method that generates a continuous magnetic layer ranging in thickness from 1.0 to 500 Nanometers. Suitable methods for depositing the magnetic layer 140 include sputtering, ion beam deposition and thermal evaporation. The magnetic layer 140 is then covered by a mask 142 that determines the patterning of the magnetic zones 147 and non-magnetic zones 144. The mask 142 is in contact with the surface of the magnetic layer 140.

In a subsequent plasma exposure step, the mask 142 and the uncovered areas of the magnetic layer are subjected to an oxygen plasma. The oxygen plasma interact with the surfaces of the uncovered areas of the magnetic layer through the voids 149 in the mask causing the selected zones 144 to be oxidized. The mask 142 can be a photo-resist coated on the magnetic layer 140 and patterned by exposure to ultra-violet radiation through a conventional lithographic mask (not shown). The unexposed portions of the photo-resist are then removed to generate a resist mask 142. The magnetic layer with the patterned resist mask is then subjected to a oxygen plasma 145. After selective oxidation of the magnetic material, the resist mask 142 is removed resulting in a patterned magnetic medium with magnetic zones 147 where the resist mask covered the magnetic layer and non-magnetic zones 144 corresponding to the voids 149 in the resist mask. This embodiment is used to pattern discrete magnetic islands that are used to record individual bits of data. A protective overcoat, typically amorphous containing hydrogen and/or nitrogen, can then be deposited over the patterned magnetic surface.

FIGS. 3 *a*–*g* illustrate using a polymer as the masking material that is patterned by embossing the surface of the polymer with a template prior to subsequent etching steps. A preferred masking polymer is polymethylmethacrylate (PMMA), whereby the PMMA is heated to the glass transition temperature prior to the patterning with the template. Alternatively, a photo-polymer is used as the masking polymer. The masking photo-polymer is preferably an Acrylate polymer containing a photo-initiator. In this case the photo-polymer is embossed with a template first and then cured with ultra-violet light prior to subsequent etching steps.

Alternatively, a substrate 113 is provided and coated with a layer 115 suitable for depositing a magnetic material. A continuous magnetic layer 119 ranging in thickness from 1.0 to 500 Nanometers is then deposited on the layer 115. A metal layer 121 is deposited over the magnetic layer 119 (see FIG. 3*a*). The metal layer 121 is preferably a refractory metal selected from tantalum, tungsten and titanium with a thickness ranging between 2.0 to 100 Nanometers. The metal layer 121 can be deposited by any suitable method that provides a continuous deposition of the non-magnetic metal layer. Suitable methods of depositing the metal layer 121 include sputtering, ion bean deposition and thermal deposition.

Figure 3A:
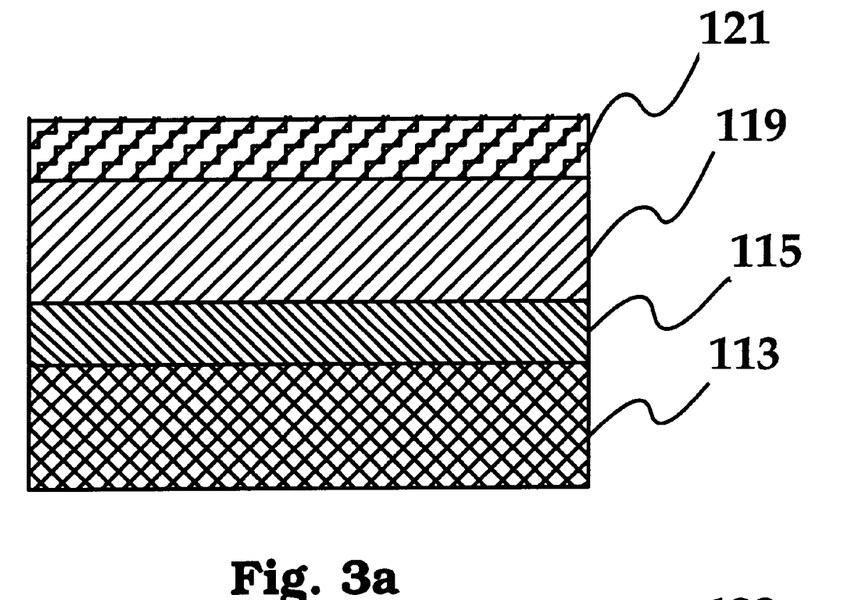
Figure 3B:
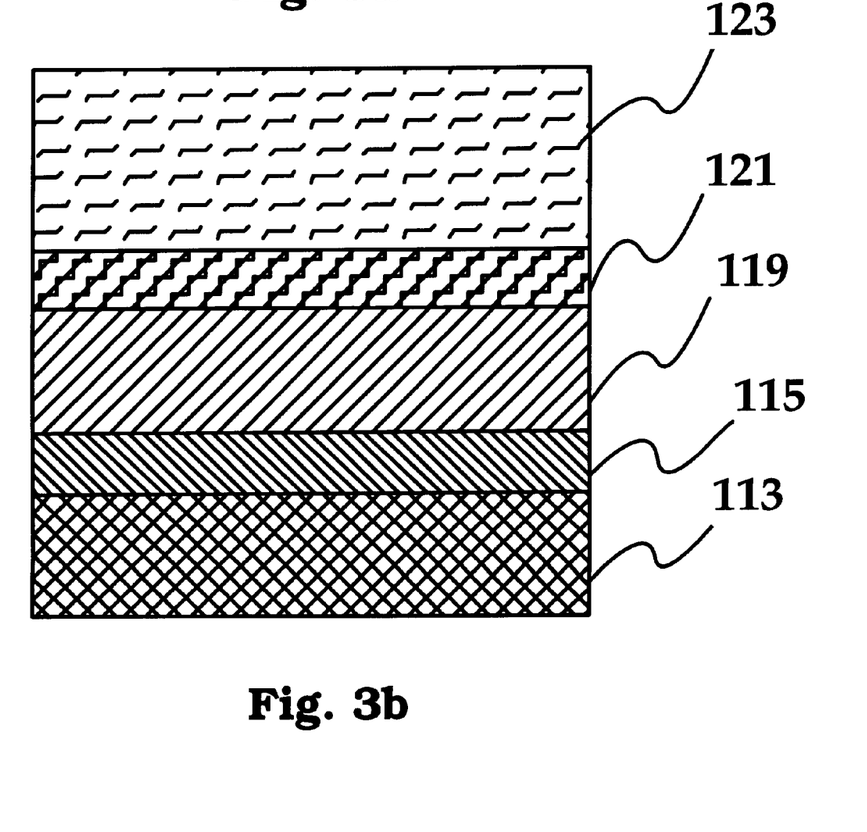

After the metal layer 121 is deposited on the magnetic layer 119, a polymer material 123 is spin-coated on the metal layer (see FIG. 3*b*). The coated polymer is embossed with a template 127 to make a patterned polymer 125 (see FIG. 3*c*). A PMMA coating is heated to its glass temperature and is patterned by impressing the surface with a template 127 having a predetermined pattern. Alternatively, a photo-polymer is patterned by impressing a template 127 with a predetermined pattern on the surface of the photo-polymer coating and cross-linking the photo-polymer with ultra-violet light.

Figure 3C:
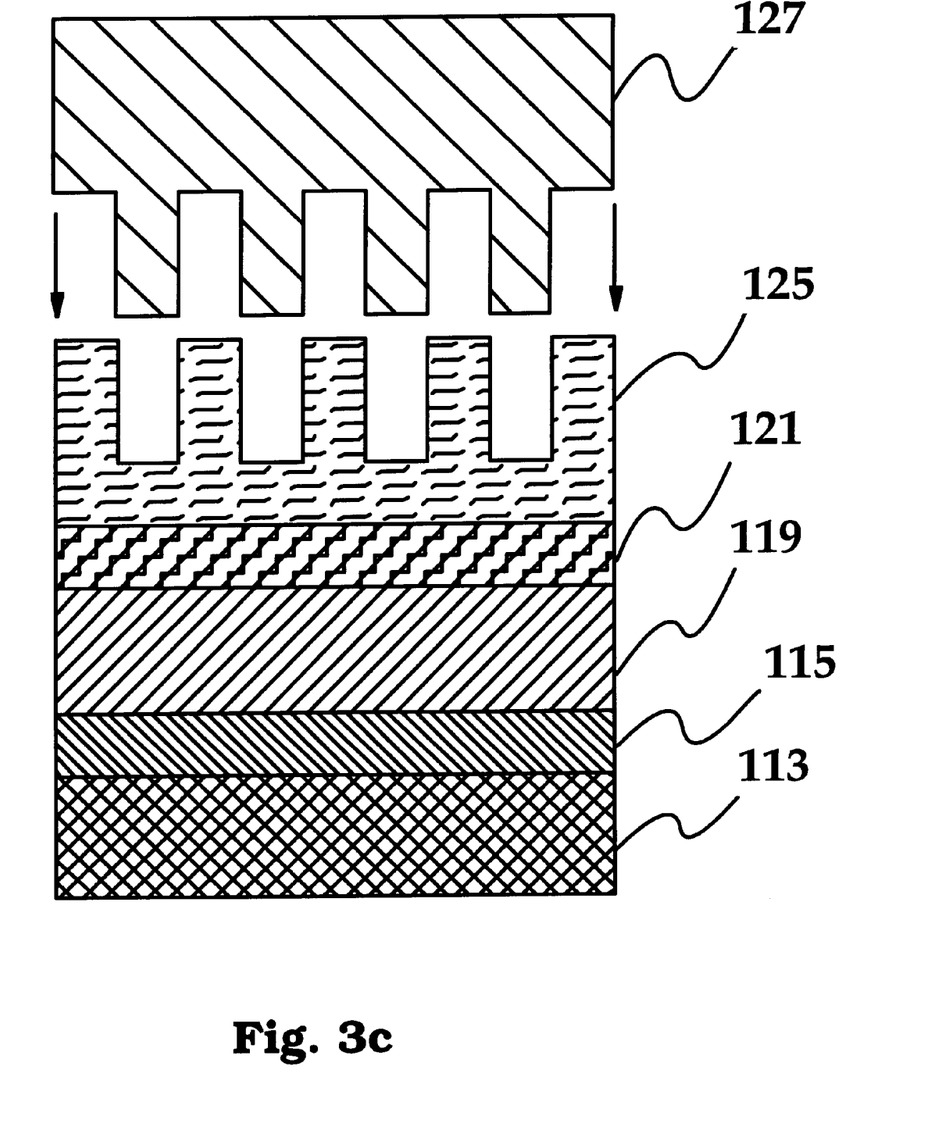
Figure 3D:
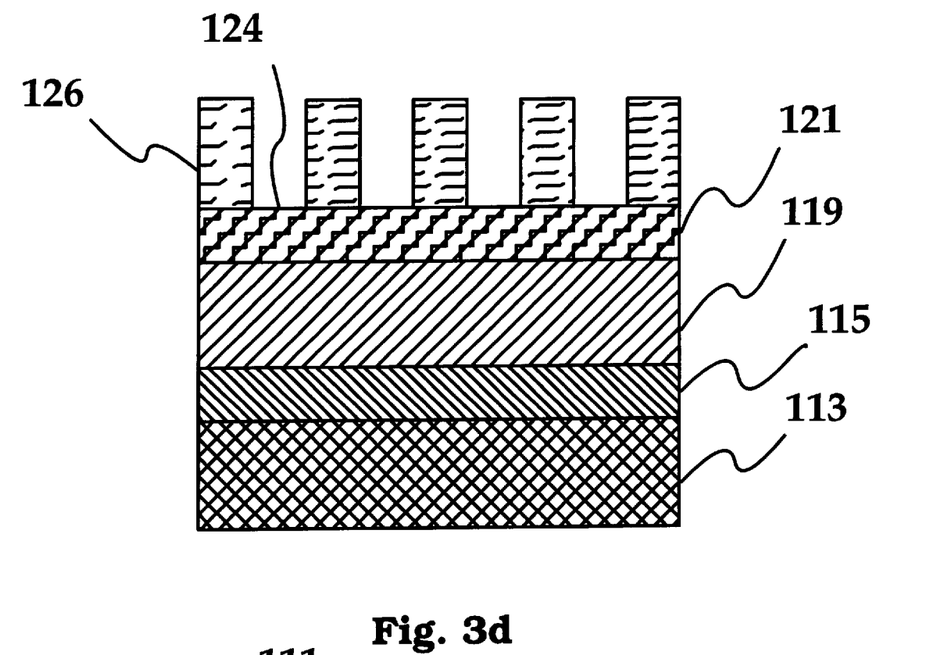
Figure 3E:
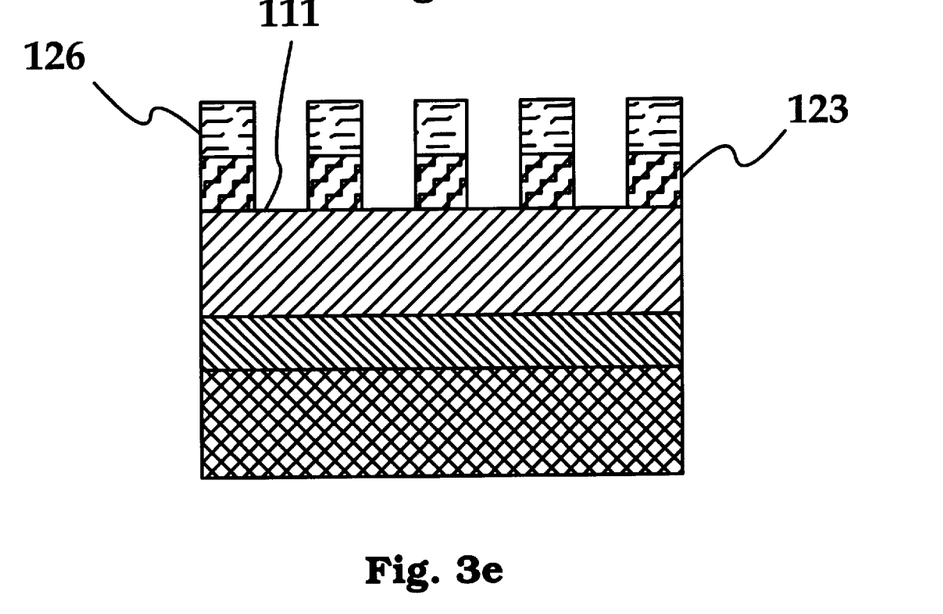
Figure 3F:
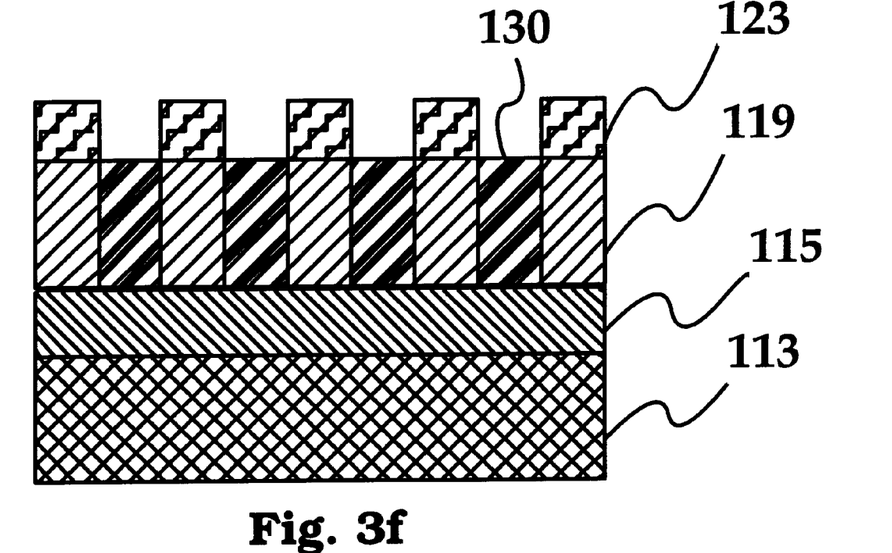
Figure 3G:
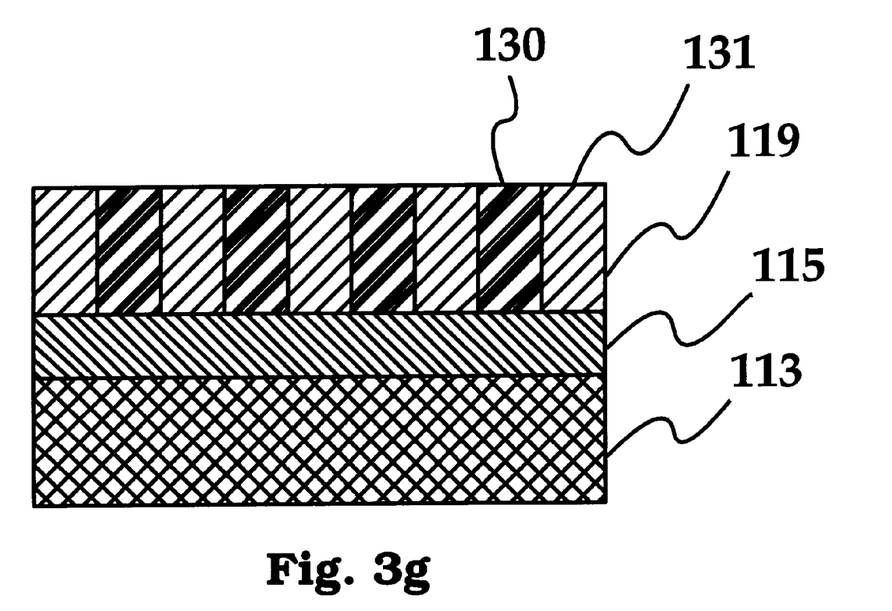

In the embossing process the template 127 has raised surfaces and depressed surfaces of a predetermined pattern. After embossing the polymer, the raised surfaces of the template correspond to depressed surfaces on the patterned polymer and depressed surfaces of the template correspond to raised surfaces of the patterned polymer. The template 127 that is used for patterning the polymeric masking material 123 is a silicon wafer that has been patterned by standard lithographic techniques or preferably patterned by electron beam writing. It will be clear to those familiar with the art that the template can be made of any material suitable for impressing their patterns on the polymeric material.

The patterned polymer layer 125 is then exposed to an oxygen plasma. The depressed surfaces of the patterned polymer 125 are etched to the metal layer 121 to produce a pattern on the metal under-layer 124 (see FIG. 3*d*) and leave a polymer mask 126 corresponding to the raised surfaces of the patterned polymer 125. The pattern to the metal under-layer 124 and polymer mask 126 are then exposed to fluorine containing plasma exposing a pattern of the magnetic layer 111 and leaving a metal mask 123 under the polymer mask 126 (see FIG. 3*e*).

In the next step, the unprotected pattern of the magnetic layer 111 and the polymer mask 126 are subjected to oxygen plasma, thereby removing the polymer mask 126 and converting the pattern of the exposed magnetic layer 111 to non-magnetic zones 130. The magnetic zones 131 are defined by metal mask 123 (see FIG. 3*f*). In a third etching step, a fluorine containing plasma is used to remove the metal mask 123 resulting in a patterned magnetic medium with a smooth surface that is continuous between the magnetic zones 131 and non-magnetic zones 130 (see FIG. 3*g*). A light sputtering etch is used to remove any contaminant fluorine from the surface of the medium due to exposure from the fluorine containing plasma. The magnetic layer is then covered with a protective overcoat, such as a sputter-deposited amorphous carbon layer, that replicates the smooth patterned magnetic layer surface.

Figure 4:
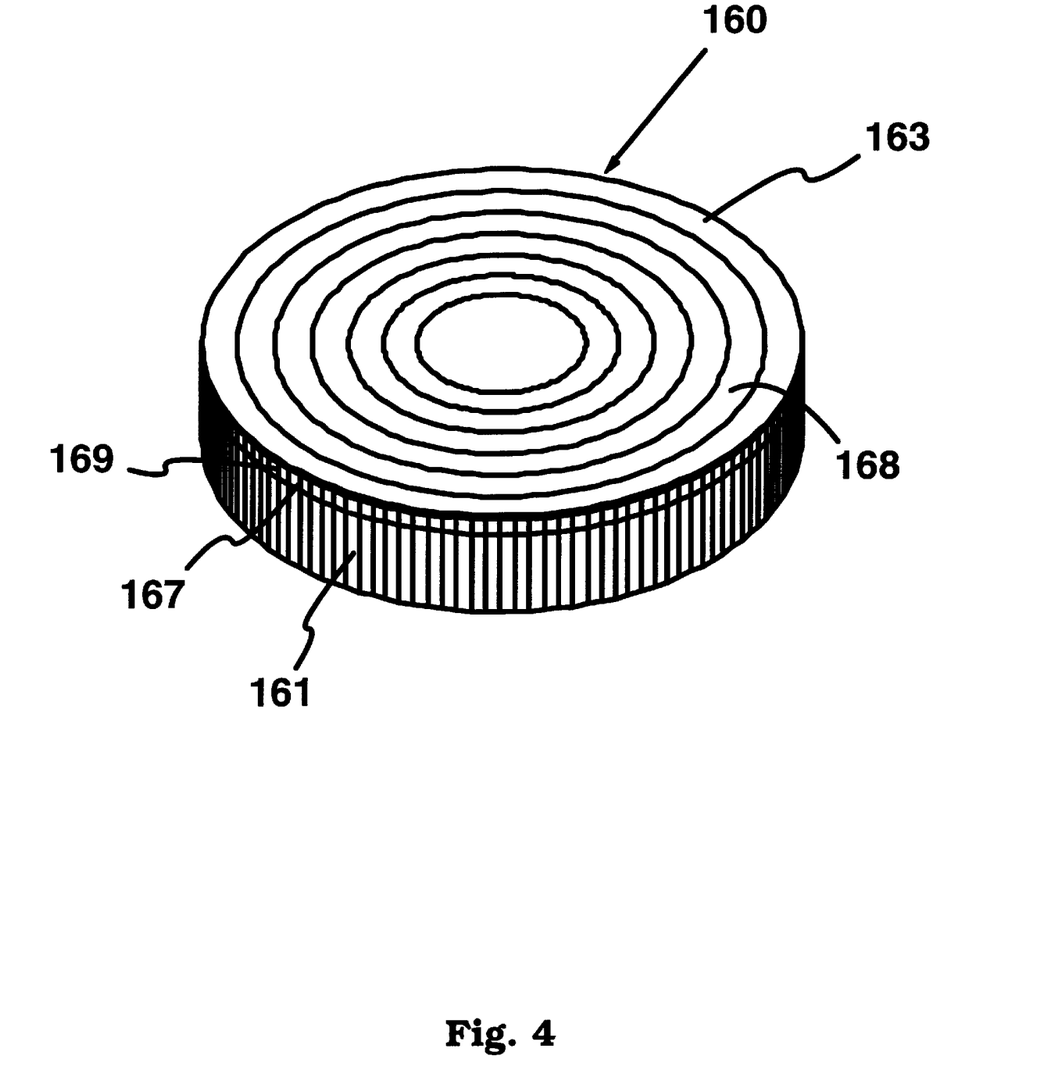
FIG. 4 is a disk patterned according to the invention.

Referring to FIG. 4, the method described is used to fabricate a magnetic storage disk 160. The disk is a layered structure comprising a supporting substrate 161 coated with and an under-layer 167 suitable for depositing a Co alloy magnetic layer 169. The Co alloy preferably comprises $Cr_x$, $Fe_y$, and $Pt_z$, wherein $0 \leq x \leq 30$, $0 \leq y \leq 40$ and $0 < z \leq 80$ atomic percent, and $25 \leq (x+y+z) \leq 80$; the Co alloy may also contain Ni. In the exposure to oxygen, the magnetic moment of the magnetic material is substantially reduced. The magnetic atoms will bond with the oxygen atoms to form non-magnetic compounds that are non-magnetic; for example, $CoO$, $Co_3O_4$, $\alpha\text{-}Fe_3O_4$ and $NiO$ are all non-magnetic. The disk can either be patterned to have isolated magnetic domains similar to FIG. 2, or alternatively, as shown in FIG. 5, to have alternating magnetic 163 and non-magnetic 165 radially-spaced tracks. The non-magnetic tracks 165 are spacer tracks that separate the magnetic tracks 163 that are used to record data.

What is claimed is:

1. A method of making a patterned magnetic medium having magnetic zones and substantially non-magnetic zones by selectively oxidizing unprotected zones of a magnetic layer comprising the following steps:
   a) providing a medium substrate;
   b) depositing on said medium substrate a magnetic layer;
   c) providing a patterned protective mask on said magnetic layer wherein there are uncovered zones and covered zones of said magnetic layer;
   d) exposing said patterned protective mask and said uncovered zones to an oxygen plasma to reduce the local magnetic moment of said unprotected zones; and
   e) removing said patterned protective mask.

2. The method of claim 1 wherein said substantially non-magnetic zones have a local magnetic moment that is at least 25% less than said magnetic zones.

3. The method of claim 1 wherein said magnetic layer comprises a Co alloy comprising $Cr_x$, $Fe_y$ and $Pt_z$, wherein $0 \leq x \leq 30$, $0 \leq y \leq 40$ and $0 < z \leq 80$ atomic percent, and $25 \leq (x+y+z) \leq 80$.

4. The method of claim 1 wherein said medium substrate is selected from the group consisting of an aluminum-magnesium alloy with a plated nickel phosphorus coating, glass, silicon, ceramic and quartz.

5. The method of claim 4 wherein said medium substrate is a rigid disk substrate.

6. The method of claim 1 wherein said magnetic layer has a thickness ranging from 1.0 to 500 Nanometers.

7. The method of claim 6 wherein said magnetic layer is deposited by a process selected from the group consisting of sputtering, ion-beam deposition and vapor deposition.

8. The method of claim 1 wherein said patterned protective mask is provided by the additional steps of:
   a) applying a photo-sensitive polymer on said magnetic layer;
   b) exposing said photo-sensitive polymer with ultra-violet radiation to cross-link said photo-sensitive polymer in a predetermined pattern; and
   c) removing unexposed portions of said photo-sensitive polymer.

9. The method of claim 8 wherein said predetermined pattern is defined by exposing said photo-sensitive polymer with UV radiation through a template.

10. The method of claim 1 wherein said patterned protective mask is a polymer mask provided by the additional steps of:
    a) applying a photo-sensitive polymer layer on said magnetic layer;
    b) placing a template in contact with said photo-sensitive polymer, said template having a predetermined pattern comprising raised surfaces and depressed surfaces;
    c) applying a predetermined pressure and temperature to said template and said substrate to make an embossed polymer layer, whereby said raised surfaces of said template are depressed surfaces of said embossed polymer layer and depressed surfaces of said template are raised surfaces of said embossed polymer layer;
    d) curing said embossed polymer layer with ultra-violet radiation to make an embossed cross-linked polymer;
    e) separating said template from said embossed cross-linked polymer layer; and
    g) removing said depressed surfaces from said embossed cross-linked polymer layer to make a polymer mask.

11. The method of claim 10 wherein said template is a silicon template.

12. The method of claim 11 wherein said silicon template is patterned by a method selected from the group consisting of etching and electron beam writing.

13. The method of claim 1 wherein said protective mask is a metal mask that is provided by steps comprising:
    a) depositing a metal layer of a predetermined thickness on said magnetic layer;
    b) coating a polymer layer on said non-magnetic metal layer;
    c) embossing said polymer layer with a template having a predetermined pattern;
    d) removing embossed portions of said polymer layer, to thereby provide a patterned metal layer; and
    e) etching said patterned metal layer, to thereby expose a patterned magnetic layer underlying and leave said metal mask.

14. The method of claim 13 wherein said metal layer is a refractory metal selected from the group consisting of tantalum, tungsten and titanium.

15. The method of claim 14 wherein said metal layer is deposited by a process selected from the group consisting of sputtering, ion-beam deposition and vapor deposition.

16. The method of claim 15 wherein said predetermined thickness of said metal layer ranges from 2 to 100 Nanometers.

17. The method of claim 13 wherein said polymer is selected from the group consisting of a PMMA polymer and an Acrylate polymer.

18. The method of claim 17 wherein said polymer is embossed with a silicon template.

19. The method of claim 18 wherein said silicon template is patterned by electron-beam writing.

20. The method of claim 13 wherein said depressed surfaces of said polymer are removed by etching.

21. The method of claim 13 wherein said metal mask is removed by etching with a fluorine containing plasma.

22. A method of making a magnetic disk medium with magnetic zones and substantially non-magnetic zones comprising the following steps:
    a) providing a substrate with a magnetic layer of a predetermined thickness;
    b) depositing a metal layer of a predetermined thickness on said magnetic layer;
    c) coating a polymer layer on said metal layer;
    d) placing a template in contact with said polymer layer, said template having a predetermined pattern comprising raised surfaces and depressed surfaces;
    e) applying a predetermined pressure and temperature to said template and said substrate to make a patterned polymer layer, whereby said raised surfaces of said template are depressed surfaces of said patterned polymer and depressed surfaces of said template are raised surfaces of said patterned polymer layer;

f) separating said template from said patterned polymer layer;

g) removing said polymer from said depressed surfaces of said patterned polymer layer to make a discontinuous polymer layer and a patterned metal under-layer;

h) etching said patterned metal under-layer to leave a patterned magnetic under-layer and a metal mask;

i) exposing patterned magnetic under-layer to an oxygen plasma to substantially reduce the local magnetic moment of the exposed patterned magnetic under-layer; and j) removing said polymer and said metal mask; thereby generating a magnetic disk medium with said magnetic zones and substantially non-magnetic zones.

23. The method of claim 22 wherein said substantially non-magnetic zones have a local magnetic moment that is at least 25% less than said magnetic zones.

24. The method of claim 22 wherein said magnetic layer comprises a Co alloy comprising $Cr_x$, $Fe_y$ and $Pt_z$, wherein $0 \leq x \leq 30$, $0 \leq y \leq 40$ and $0 < z \leq 80$ atomic percent, and $25 \leq (x+y+z) \leq 80$.

25. The method of claim 22 wherein said predetermined thickness of said magnetic layer ranges from 1.0 to 500 Nanometers.

26. The method of claim 22 wherein said metal layer is a refractory metal selected from the group consisting of tantalum, tungsten and titanium.

27. The method of claim 22 wherein said predetermined thickness of said metal layer ranges from 2.0 to 100 Nanometers.

28. The method of claim 22 wherein said template is an etched silicon wafer.

29. The method of claim 22 wherein said template is etched by a process selected from the group consisting of chemical etching, plasma etching and electron beam writing.

30. The method of claim 22 wherein said polymer is selected from the group consisting of PMMA and Acrylate photo polymers.

31. The method of claim 22 wherein said patterned polymer is removed by reactive ion etching.

32. The method of claim 22 wherein said portions of said polymer are removed by etching.

33. The method of claim 22 wherein said metal mask is removed by etching with a fluorine containing plasma.

34. A magnetic recording disk comprising
   a) a substrate; and
   b) a magnetic recording layer formed over said substrate and comprising discrete magnetic zones formed of a cobalt alloy and separated by discrete non-magnetic zones formed of one or more oxides of cobalt, said magnetic and non-magnetic zones forming a continuous layer having a substantially smooth surface topography.

35. The disk according to claim 34 wherein said magnetic zones are discrete islands for the recording of individual bits.

36. The disk according to claim 34 wherein said magnetic zones are generally circular tracks for magnetic recording of data and said non-magnetic zones are generally circular spacer tracks separating said magnetic data tracks.

37. The disk according to claim 34 wherein said cobalt alloy includes nickel, and wherein the non-magnetic zones are formed from a material including oxides of nickel.

38. The disk according to claim 34 wherein said cobalt alloy included iron, and wherein the non-magnetic zones are formed of material including oxides of iron.

39. The disk according to claim 34 wherein said substrate is formed of a material selected from the group consisting of glass, silicon, ceramic, quartz and an aluminum-magnesium alloy with a nickel-phosphorus surface coating.

40. The disk according to claim 34 further comprising a protective overcoat formed on said surface of said magnetic recording layer.

* * * * *